United States Patent
Dixon

(10) Patent No.: US 6,941,907 B2
(45) Date of Patent: Sep. 13, 2005

(54) HOMOGNEOUS OR PREMIXED CHARGE AUTO-IGNITION ENGINE

(76) Inventor: Michael Patrick Dixon, 18 Errol Street, Footscray Victoria 3011 (AU)

( * ) Notice: Subject to any disclaimer, the term of this patent is extended or adjusted under 35 U.S.C. 154(b) by 0 days.

(21) Appl. No.: 10/220,944

(22) PCT Filed: Mar. 9, 2001

(86) PCT No.: PCT/AU01/00252

§ 371 (c)(1), (2), (4) Date: Sep. 9, 2002

(87) PCT Pub. No.: WO01/66920

PCT Pub. Date: Sep. 13, 2001

(65) Prior Publication Data

US 2003/0075121 A1 Apr. 24, 2003

(30) Foreign Application Priority Data

Mar. 9, 2000 (AU) .............................. PQ6135
Mar. 14, 2000 (AU) .............................. PQ6240

(51) Int. Cl.⁷ .............................................. F02B 19/16
(52) U.S. Cl. ................................. 123/78 D; 123/48 A
(58) Field of Search ......................... 123/48 R, 48 D, 123/78 R, 78 D, 48 A, 78 A, 286, 289, 291–293, 274, 277, 48 AA

(56) References Cited

U.S. PATENT DOCUMENTS

| 2,614,546 | A | * | 10/1952 | Schwarz | 123/48 D |
| 3,964,452 | A | * | 6/1976 | Nakamura et al. | 123/78 AA |
| 4,088,099 | A | | 5/1978 | Gruden | |
| 4,168,678 | A | * | 9/1979 | Nohira et al. | 123/306 |
| 4,715,347 | A | * | 12/1987 | Hampton et al. | 123/551 |
| 4,890,585 | A | * | 1/1990 | Hathorn | 123/48 A |
| 5,803,026 | A | * | 9/1998 | Merritt et al. | 123/48 R |
| 6,508,229 | B2 | * | 1/2003 | Miyakubo et al. | 123/305 |
| 6,543,411 | B2 | * | 4/2003 | Raab et al. | 123/305 |

FOREIGN PATENT DOCUMENTS

| DE | 44 17 309 A1 | 12/1994 |
| FR | 2478735 | 9/1981 |
| GB | 2079365 A | 1/1982 |

* cited by examiner

Primary Examiner—Marguerite McMahon
(74) Attorney, Agent, or Firm—Edwin D. Schindler

(57) ABSTRACT

A homogeneous or pre-mixed charge auto-ignition engine comprising two interconnected chambers (20, 30) one of which is the combustion chamber (20) and the other (30) containing the power transmitting member (31). Between the two chambers (20, 30) there is means to control the pressure movement (40, 41, 43, 46) therebetween when the air/fuel mixture in the combustion chamber (20) ignites so that the force of combustion is effectively applied to the piston (31).

19 Claims, 2 Drawing Sheets

HOMOGNEOUS OR PREMIXED CHARGE AUTO-IGNITION ENGINE

Figure 1:
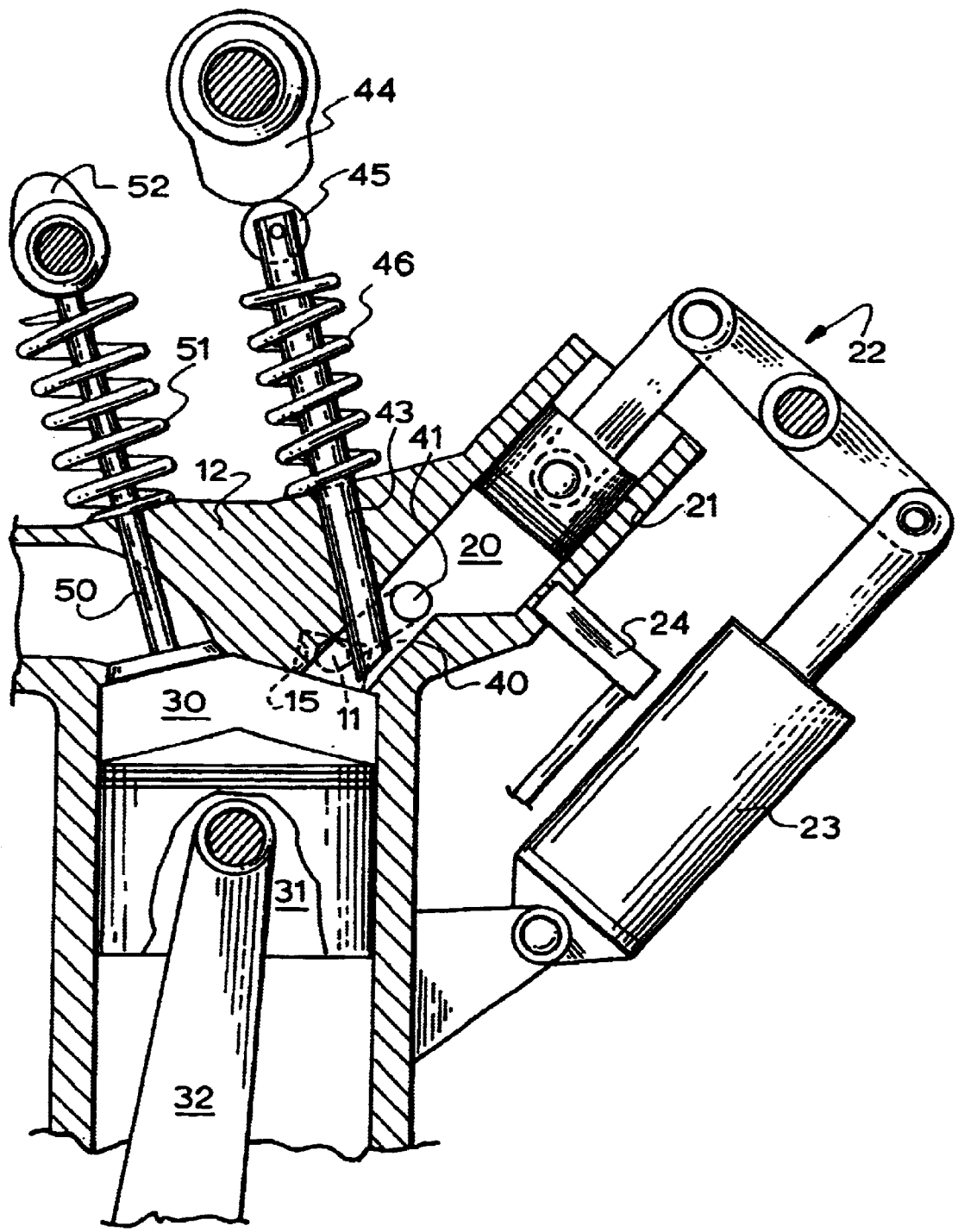

This invention relates to an auto-ignition engine which is an engine which uses a lean mixture and operates at a high compression ratio, the arrangement being such that ignition occurs when predefined parameters are met.

Lean mixture combustion and high compression ratios are parameters that can make an engine a better thermodynamically than more conventional engines. The engine will utilise the phenomenon of auto-ignition as the means of causing ignition to effect combustion of a homogeneous or premixed charge, coupled with a system that presents to the charge, temperatures and pressures of sufficient magnitude as to cause auto-ignition of the charge at the appropriate point in the engine cycle, taking into account the ignition delay time, as the means of controlling ignition timing.

Aside from controlling the ignition timing of the combustion process there are several other considerations concerning the combustion process that need to be addressed.

The major two of these are engine knock and rate of pressure rise.

Whilst the engine of the invention is a compression ignition engine it should not be confused it with a diesel compression ignition engine as the fuel delivery, ignition timing system and combustion regimes are vastly different.

The engine of the invention is a new type of engine, as different from a conventional spark ignition engine or a diesel engine as these two engines differ from one another, and the general operation of such engines is described in my PCT Application, PCT/AU98/00728, now U.S. Pat. No. 6,427,643, issued Aug. 6, 2002.

Different combustion regimes and timing systems are what differentiates the spark ignition engine from the diesel compression ignition engine. Since the combustion regime, timing system and the thermodynamic basis of operation of the engine of the invention are different to both the spark-ignition engine and the diesel engine it is in a category of it's own.

It is the object of the invention to provide such an engine.

In its broadest aspect I provide an internal combustion auto-ignition engine using a fuel/air mix, the combustion volumes of which engine each has a compression ratio such that the fuel/air mix auto-ignites, including varying the ignition point of the fuel/air mix by dynamically modifying the compression ratio of each combustion volume of the engine so that auto-ignition commences at a pre-determined point during the engine cycle to account for the charge ignition delay time under the specific operating parameters of the engine at the time, and having means to control the gas pressure rise rate and thus the force due to combustion applied to the power transmitting member associated with the combustion volume.

In a more specific form, I provide an internal combustion auto-ignition engine using a fuel/air mix, the combustion volumes of which engine each comprise two chambers the combustion chamber having means whereby the fuels air mix can be added thereto and the has a compression ratio such that the fuel/air mix auto-ignites, including varying the ignition point of the fuel/air mix by dynamically modifying the compression ratio of each combustion volume of the engine so that auto-ignition commences at a pre-determined point during the engine cycle to account for the charge ignition delay time under the specific operating parameters of the engine at the time, and having means to control the gas pressure rise rate and thus the force due to combustion applied to the power transmitting member.

In one form of the engine, this is achieved by having two cylinders and two pistons in association, the first piston being connected by a connecting rod to a crankshaft and the other piston being moveable in its cylinder by a device operated by an engine control system which provides an effective compression ratio for the composite ignition volume to ensure ignition of the charge at the required position of the first piston.

Preferably the combustion takes place in the cylinder having the other piston.

Preferably, the two volumes can be interconnected in such a way that movement between the volumes of the gas formed by ignition and subsequent combustion is controlled.

The engine of the invention can reduce fuel consumption (vis-a-vis a normal spark ignition engine) by approximately 40%–45% in the low load range (i.e. 0–60 km/h) and up to 30% at peak power loads. This is compared with spark ignition engines and using spark-ignition model fuel (i.e. petrol). During urban travel such reductions in fuel consumption enables a motorist to travel nearly twice as many kilometers per liter as they can currently travel. This also means that greenhouse gas emissions will be reduced by the same approximately 40%–45% at urban travel loads and by approximately 30% at peak power loads. Other exhaust emissions i.e. oxides of nitrogen, carbon monoxide and hydrocarbons will also be substantially reduced.

An engine that runs ultra-lean and at a very high compression ratios is more efficient than a spark ignition engines. Spark ignition engines will not function adequately at mixture strengths of below about 0.8 or 80% of stoichiometric due mainly to misfire. Further, petrol cannot tolerate compression ratios higher than about 10:1 in spark ignition engines due to the propensity of the engine to knock especially at higher loads.

The engine of the invention is an engine that will operate at ultra-lean mixture strengths and at very high compression ratios combusting petrol (and possibly other fuels). The fact that it can operate under these circumstances has to do with the phenomenon of auto-ignition of hydrocarbons and an associated phenomenon known as the ignition delay time.

Auto-ignition is the spontaneous ignition of a fuel and air charge which occurs if the charge has been raised to a temperature and pressure of sufficient magnitude. The ignition delay time is a period of time that lapses, after the charge of air and fuel has been raised to a temperature and pressure sufficiently high enough to cause auto-ignition, before ignition actually occurs. The ignition delay time is a very short period of time but of a duration that can be exploited in the realization of an adaptive auto-ignition engine.

The main three parameters that determine the duration and start of the ignition delay time of a petrol or fuel with a specific octane rating are temperature, pressure and mixture strength. The preferred method of effecting control over temperature and pressure is by the use of a variable compression ratio system. With engines or any compression process, the compression ratio (the ratio between the original volume occupied and the final volume) determines what the temperature and pressure will be at the completion of compression.

Increasing the compression ratio will force the latter stages and end of compression temperatures and pressures up. Decreasing the compression ratio will force the latter stages and end of compression temperatures and pressures down. Varying the compression ratio will then cause variation vary the duration and the start of the ignition delay time. Varying the compression ratio as required then asserts control over ignition timing.

Consider an engine running at 2000 rpm at a constant fuel delivery (a car traveling at 60 kph on the road). Consider also that it is desirable for ignition to occur at 5 degrees before top dead centre (BTDC). At 2000 rpm the engine crank sweeps out 12 degrees of crank angle every millisecond. If the ignition delay time for the fuel mixture strength is one millisecond then for ignition to occur at 5 degrees BTDC the compression ratio must be set such that the temperature and pressure which will cause auto-ignition must be reached one millisecond before the piston reaches TDC. That is, it must reach these conditions as the piston passes the point coincident with the crank angle of 17 degrees BTDC, that is 12 degrees before the position at which ignition actually occurs.

If the engine slows down to say 1500 rpm at the same fuel delivery (the car is traveling up a hill with the accelerator pedal unchanged). The engine will now sweep out 9 crank angle degrees every millisecond. If ignition is to occur at the same point of 5 degrees BTDC and the ignition delay time is still one millisecond, then the appropriate temperature and pressure must be presented to the charge at 5 plus 9 degrees BTDC. That is the compression ratio must be reduced so that the appropriate temperature and pressure are presented to the charge as the piston passes the point coincident with the crank angle of 14 degrees BTDC. Again the compression ratio setting accounts for the time lag of 1 millisecond in terms of crank angle degrees before ignition occurs.

If the engine speeds up to say 2500 rpm at the same fuel delivery (the car is now traveling down the hill with the accelerator pedal unchanged). The engine will now sweep out 15 crank angle degrees every millisecond. If ignition is to occur at the same point of 5 degrees BTDC and the ignition delay time is still one millisecond, then the appropriate temperature and pressure must be presented to the charge at 5 plus 15 degrees BTDC. That is the compression ratio must be increased so that the appropriate temperature and pressure are presented to the charge as the piston passes the point coincident with the crank angle of 20 degrees BTDC.

In this explanation it has been assumed that the ignition delay time remains constant as the compression ratio is varied. Strictly, this is not the case, the delay time does vary However the assumption is reasonable for the purposes of the explanation but in reality variations in the duration of the ignition delay time resulting from changes in the compression ratio will lead to the necessity of compensation.

If the fuel delivery is reduced then the ignition delay time will increase and therefore the compression ratio must range over higher values to cope with changes in engine speed. Similarly if fuel delivery is increased the ignition delay time reduces and the compression ratio must adopt lower values to cope with the changes in engine speed.

By installing a secondary cylinder and a secondary piston in the cylinder-head of the engine associated with each main cylinder. Controlling the position of the secondary piston then sets the compression ratio of the two cylinder/piston assemblies and therefore controls ignition timing.

There are many ways to control the positioning of secondary piston as appropriate. One such way is to measure a series of parameters, peak pressure, peak temperature, accelerator setting, engine speed etc. Then, by using a preprogrammed engine control system, the position of the secondary piston position can be set by an electronically controlled driven actuator on the basis of the parameter values to cause auto-ignition at the required position of the main piston.

Another possible method can be by causing the compression ratio to be driven to lower or higher settings and have the fuel delivery follow the compression ratio. It is understood that any system which intersects an appropriate compression ratio with load demand (fuel delivery), engine revs and any other governing parameters may be used.

In the main, controlling the temperature and pressure of the charge relative to the mixture strength and engine revs controls the ignition timing. Therefore the requirements for the engine can be realized by any configuration or system that asserts adequate control over the charge temperature and pressure.

Some other configurations and systems associated with the engine may be used to effect adequate control over the temperature and pressure. These are: variable valve timing variable displacement variable compression ratio pistons (i.e. variable compression height of piston or secondary piston in main piston crown), regulation of charge mass delivery, variable connecting rod length by the use of eccentrics on the little-end of the connecting rod adjacent the gudgeon or on the big-end of connecting rod adjacent the main bearing.

There are many criteria that must be met if an engine is to be a functional device. Of primary concern is that the combustion process be suitable.

A suitable combustion and operating process requires among other considerations that:

1) Ignition occurs at the appropriate point in the engine cycle (i.e. timing);
2) That the rate of pressure rise be such that no detrimental effects occur to the engine components and that engine noise be minimised under normal operating conditions; and
3) Engine knock be eliminated or pose no detrimental effects to the engine components or to the functional operation of the engine.

The combustion and operating process for the engine of the invention takes into account each of these.

In dealing with the rate of pressure rise for the engine it is useful to consider the pressure rise in spark ignition engines and diesel compression ignition engines. Spark ignition engines and diesel compression ignition engines regulate the rate of pressure rise by controlling the rate at which the fuel and air combust.

In a spark ignition engine a flame initiating at the spark plug travels through the combustible mix at a finite speed. The pressure rise is proportional to the flame speed as the flame speed dictates the rate of consumption of combustible mix.

In diesel compression ignition engine the fuel injection rate and charge motion dictates the rate of mixing of fuel and air and thereby the rate of consumption of the combustible mix. Again the pressure rise is proportional to the rate of consumption of the combustible mix.

With the engine of the invention, very little control can be exerted on the combustion rates of the fuel air mix and indeed the rates are very high. It is therefore necessary to deal with the rate of pressure rise in a different way.

The volume of an engine is made up of a swept volume and a clearance volume. In a reciprocating piston configuration the clearance volume is between the piston crown and the combustion surface of the head. To control the rate of pressure rise in the engine the clearance volume is minimised and the main part of the combustion chamber is a separate volume called the main combustion chamber. It is understood that there may be several combustion chambers per cylinder. The main combustion chamber can be partitioned off so that it communicates with the clearance volume through a opening in the dividing element or through a connecting passageway. The main combustion chamber can be integral to or connected to the secondary cylinder/secondary piston arrangement used for varying the compression ratio. The main combustion chamber can be in the main or secondary piston.

All or the majority of the fuel will be delivered into the main combustion chamber either by direct injection into the main combustion chamber or by stratifying the intake charge such that the majority of the fuel will be compressed into the main combustion chamber during the compression process.

Where the fuel is being direct injected, it is desired that this injection takes place as early as possible during the induction or the compression parts of the cycle to ensure that the fuel is evaporated and is close to homogeneous as practical before the compression part of the cycle is completed.

In some applications, particularly where maximum power is required I may use a combination of direct injection and delivery mixed with the input air. The geometry of the communication system between the main combustion chamber and the clearance volume will be such that it will reduce the high rate of pressure rise as felt by the main piston associated with the very rapid combustion that prevails with auto-ignition of a homogenous or premixed charge. It is preferred that the configuration is where the main combustion chamber is integral to the secondary cylinder/secondary piston arrangement. That it will form a volume between the secondary piston and the communication system to the clearance volume. The communication system between the clearance volume and the main combustion chamber is a passageway of a length and a flow area that suitably restricts the mass flow rate between the two volumes should the pressure difference become too great.

The operation of the system is as follows:

In a preferred form, there is only compressed air above the main piston that all the fuel is in the premixed charge in the main combustion chamber. The combustion rate is extremely rapid such that the pressure rise sets up a large pressure differential (approximately 40–50 bar) between the combustion chamber and the clearance volume (this will be the case at near stoichiometric fuel air mixtures) at the time of combustion. In the invention, it is necessary to meter the high pressure gas out of the main combustion chamber and into the clearance volume at a rate suitable for the functional operation of the engine. That is, the pressure rise rate is such that no damage to the engine components occurs and noise is minimised.

A further constraint that the system is subject to is that charging and discharging of the main combustion chamber is not overtly impeded at higher engine revolutions (approximately 4000–5000 revs). By suitably sizing and shaping the communication system between the clearance volume and the main combustion chamber these two primary constraints may be met.

The size and shape of the communication system can vary or be varied to give optimum operation during the engine cycle.

It is understood that baffling and valving including throttle openings, externally operated valves, static and dynamic valves venturies, bluff bodies and flow regime precipitation shapes can be employed in any of the volumes and their communication system to attain these two objectives.

It will be appreciated that the communication system between the clearance volume and the main combustion chamber needs to afford functional operations throughout the complete engine cycle.

Figure 2:
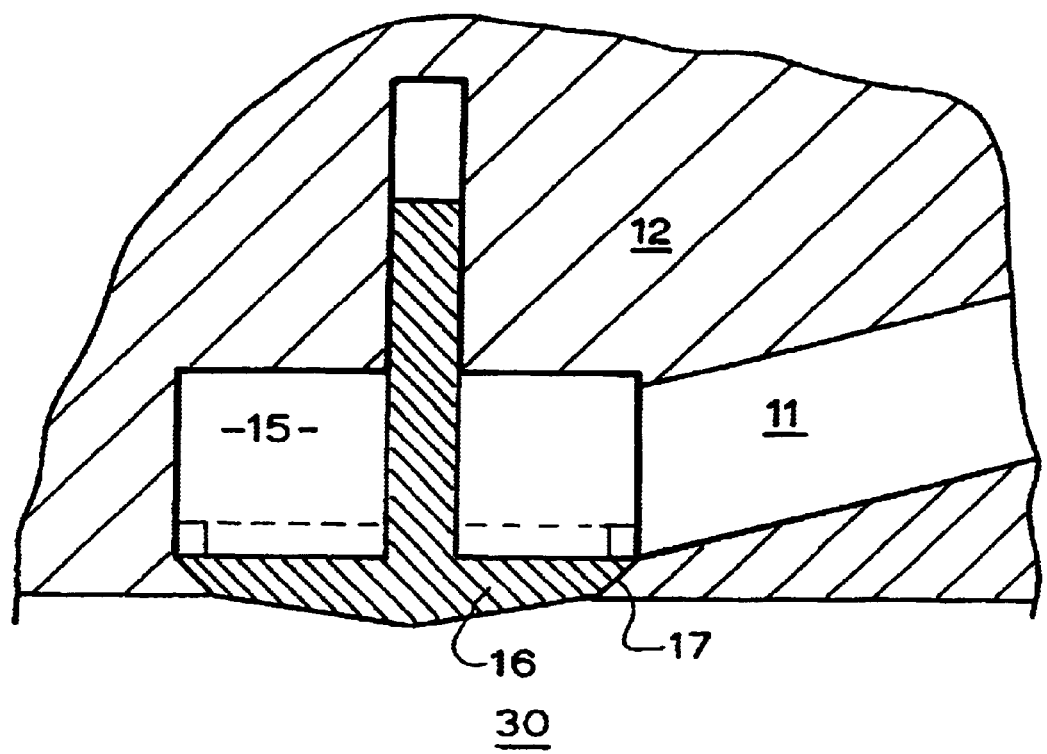

Particular arrangements are illustrated in the attached drawings, in which:

FIG. 1. Is a schematic view of an engine embodying the concept of the invention;

FIG. 2. Is a view of one form of unidirectional valve in the engine of FIG. 1.

Referring to FIG. 1, there is an arrangement of engine made in accordance with the invention which can be suitable in an operative engine.

In this case, the combustion volume 20 and the clearance volume 30 are interconnected by a passage 40, which will be described further later.

The combustion volume 20 has a piston 21 which is controlled, as illustrated, by a linkage 22 being associated with a ram 23 which can be computer controlled to ensure that the piston 21 is in a position to ensure that the compression ratio of the combustion chamber 20/clearance volume 30 is selected to ensure that auto-ignition commences at the required position of movement of the piston 31 which is connected, by connecting rod 32 to the crankshaft of the engine.

The piston 21 may be 'pseudo static', that is it moves only as necessary to be in the required position to give the correct ignition point based on the present parameters of operation of the engine. Thus, whilst I refer to this as static, the piston will be in continuous movement to maintain the required condition.

Alternatively, it may be 'moving' to ensure lubrication and to minimise carbon build up under which arrangement it may be moved to the top of its stroke, that is to the lower portion of the cylinder as illustrated during every revolution, every cycle or after a certain number of cycles before returning to its required position.

This movement is effected by the ram 23 operating through linkage 22 and the ram operation is effected by an engine management system.

In each case the piston is 'dynamic' in that the position of the piston at the time of ignition is in the position necessary to ensure that ignition takes place to compensate for the charge ignition delay time so that combustion proceeds at such a time as to ensure that the combustion gas is formed when the power inherent therein can be used to the maximum benefit of the engine.

The clearance volume has as least two valves, valve 50 as shown which has a valve spring 51 about its stem an which is actuated by a cam 52 and a second valve, not shown, which can be effectively identical and physically located behind valve 50. Indirect connection of the valves to the cams is possible. One of the valves is the inlet valve for the charge or the air used for combustion and the other the exhaust valve.

The combustion volume 20 has associated therewith a fuel mixture inlet, normally a direct injector 24.

Referring to FIG. 1, there is shown the passageway 11 between the combustion chamber 30 and the clearance volume 30. The passageway 11 terminates in a chamber 15, which has a valve 16, which is biased to normally be in contact with the seat 17.

The arrangement is such that during the inlet stroke, or very early in the compression stroke the fuel is injected into the combustion volume by the injector 24 and thus has time to vaporise and become homogeneous with the inlet air entering through the passageway 40 being driven by the piston 31 reducing the volume of the clearance volume 30 before compression starts or at very early stages of compression. The fuel can be swirled on injection to assist this mixing or the air passing into the combustion chamber can be caused to swirl.

Whilst a preferred operation uses direct fuel injection into the combustion chamber, there are two alternative systems of fuel inlet.

In the first, the fuel can be mixed with the combustion air before the air/fuel mixture is passed through the inlet valve. This is generally not preferred as any air in the clearance volume will have fuel therein and this may not only cause fuel waste but there can be uncontrolled combustion.

If maximum power is required, I may however use a combination of direct injection and stratified charge so that the induced air is mixed with fuel. In cases such as this the amount of fuel in the inducted air is generally substantially low.

Located in the passageway is a member 43, such as a blade, which can be of any required forms, but may well be a rod or some other elongate shape as it extends through the cylinder, head 12. For descriptive purposes only, this will be called a "blade".

The aperture 41, being the outlet of the passage 40 is on the combustion chamber side of blade 43 and the chamber 15, and valve 16 on the clearance volume 30 side.

The blade has a stem about which there is fitted a spring 46 and has at its free end a cam follower 45 which acts against a cam 44. The blade 43 can move between two extremes in one of which it substantially occludes the passage 40, which is the position shown in FIG. 1, and in the other it is effectively non-obtrusive in the passage.

The arrangement is such that the piston 31 is on its compression stock, the blade 43 is in the non-obtrusive position to permit relatively unrestricted flow of gas from the clearance volume 30 to the combustion volume 20. As the pressure increases and the fuel/air mix in the combustion volume approaches ignition, the blade closes so that there is effectively no gas flow through the passage. However, as there is still gas movement at that time, the increase of pressure causes the valve 16 to open, so that there can still be further air or air/fuel passed into the combustion volume.

After the fuel air mix in the cylinder 20 ignites and there is combustion, there is movement of the combustion gasses down the passage 40. There can be sufficient area at the blade or the blade can be moved slightly to provide area to permit the commencement of flow of gas into the clearance volume. The blade will thus have a throttling effect and restrict the pressure under which the combustion gasses are fed to the clearance volume and thus to the head of the piston. As the pressure in the combustion chamber reduces, the blade commences to open to permit more ready flow of the gasses to the clearance volume to act on the piston 31.

The blade can stay open during the remainder of the power stroke, the exhaust stroke and the induction stroke.

To vary the free flow area so that a suitable area will be coincident with some particular point in the engine cycle, the phase angle of the cam 44 is varied depending on the engine revs. That is, at 1000 revs per minute, the blade 43 protrudes to its furthermost position into the passageway 40; at 2000 revs per minute, a phase angle shift has occurred and the member, or blade, will have travelled to its furthest point, but will have retracted such that a greater flow area is presented at the same prescribed point in the engine cycle. At 3000 revs per minutes, the member (or blade) will have travelled to its furthest position and retracted a greater distance than for the slower revs, and so on with increasing revs. Decreasing the revs will have the phase angle shift in the opposite direction and tend to reduce the free flow area presented at the prescribed point.

Whilst the above arrangement appears to be the most satisfactory, it is possible to provide other methods of controlling the flow of gas to and from the combustion chamber.

In one particular form, the head of the piston can have an extension which incorporates a valve and this can enter a recess in the head as the piston approaches top dead centre, and it must be appreciated that over quite a substantial crankshaft angle near top dead centre the piston actually moves very little in the vertical direction. This valve can permit movement of air from the clearance volume to the combustion volume. The recess can be provided with an aperture in connection to the combustion volume which acts as a throttle. Whilst the extension on the piston is in the recess, then this acts to prevent uncontrolled movement of the gas and, as stated above this can be for a relatively long period, say up to 30° of crankshaft angle so that when combustion is occurring the movement of combustion products from the combustion chamber to the clearance volume is restricted by the extension. Once the extension leaves the recess, then greater quantities of combustion products can pass to the clearance space.

It may be preferred that the area of the aperture in the recess is varied automatically to take required areas, and thus required flow at different times in the cycle.

From the description of these two embodiments, in more general terms focusing on the compression, combustion and expansion cycles the fundamental requirements and configuration of the communication system of the engine can be explained.

During the compression cycle charging of the combustion chamber 20 from the main chamber via the communication passageway 40 needs to be as unrestricted as is practical. A practical expression of this is that the area of the communication passageway must be as large as is practical and that the discharge coefficient needs to be as large as possible.

During the expansion cycle discharge from the combustion chamber to the main chamber, nearer the end of the combustion cycle or when the pressure difference between the combustion chamber and the main chamber is small, that is, through the greater part of the expansion cycle, the gas flow must be as unrestricted as practical.

During the combustion cycle and when large pressure differences between the main chamber and the combustion chamber prevail the discharge coefficient and communication passage area must be more restrictive than for the compression and expansion cycle and be restrictive such that the rate of pressure rise in the main chamber is functional. Since mass flow rate is time dependent and the requirement for functional operation of the engine is that engine speed ranges from about 1000 to 5000 revs per minute it will be necessary to vary the communication passage area to cope with the time available as presented by the engine revs. At 5000 revs per minute the communication passage area will need to be larger than that which is suitable for 1000 revs per minute. The area will need to be varied as the engine speed demands. This was discussed earlier herein.

As well as engine revs, fuel delivery may have an effect on the required communication passage area during combustion. Generally the more fuel the smaller the area needs to be in order to control pressure rise in the clearance volume and the control system may allow for this.

One particular method to effect the required mass flow charge and discharge throughout the compression, combustion and expansion cycles will be explained as follows. The communication system between the combustion chamber and the main chamber consists of a communication passageway integral with a protraction/retraction obstruction member and an auxiliary passageway which is coupled with a unidirectional flow valve. There can be several passageways involved.

The distance the obstruction member protrudes into the passageway regulates the free flow area of the communication passageway. The obstruction member is coupled to a cam and timed such that during the greater part of the compression and expansion cycles the member is retracted and therefore the communication passageway is unrestricted. During combustion the member protrudes into the passageway and thereby reduces the free flow area.

During compression, when the obstruction member is obstructing the passageway, that is, late in the compression cycle, the auxiliary passageway coupled with the unidirectional valve allows charging of the combustion chamber to continue. During combustion mass flow cannot pass back through the unidirectional valve.

The profile of the cam is such that the obstruction member is in its rest position, that is, in its retracted position for most of the engine cycle and moves rapidly inwards at close to the end of compression cycle and retracts rapidly to be fully retracted as early as possible near the end of the combustion cycle. The obstruction member may well be coupled to hydraulic or electromagnetic actuators interfaced to a control system to effect the desired operation.

It is understood that any valving arrangement that fulfills the gas flow requirements as previously outlined can be used. This includes the use of valves or control surfaces which alter the discharge coefficients of the gas flow communication system to effect the appropriate gas flow requirements. The gas flow communication system may be self regulating or autonomous.

I previously mentioned the possible desirability of causing the piston to move over its stroke to ensure lubrication and prevent carbon build up. It is possible to have the piston 21 reciprocate at the same speed or at half the speed of the piston 31 and effect the compression ratio by varying a phase angle so that an appropriate compression ratio is presented to the charge at an appropriate point in the cycle.

In all engines there can be a problem with knock. Knock is a phenomenon that occurs when extremely high spatial pressure differentials occur over the piston. The engine components are set vibrating resulting in audible rattling and knocking sounds emanating from the engine. In spark ignition engines it is the phenomenon of auto-ignition of the end gas ahead of the flame front during combustion that sets up the pressure differentials. In diesel compression ignition engines knock occurs usually at the onset of ignition of the very first portions of the injected diesel fuel.

In the engine of the invention, the phenomenon of knock is thought to occur primarily through charge stratification brought about by uneven mixing and incomplete evaporation of inducted fuel.

A synergy that accrues through separating the main combustion chamber from the clearance volume and ensuring that only compressed air or very lean mixtures are in the clearance volume no large fuel\air detonation type pressure differentials can occur over the top of the main piston crown. Therefore knock will not occur in the clearance volume. It may well be that knocking persists during certain conditions in the main combustion chamber however since the dimensions are much smaller than the main cylinder/clearance volume dimensions it will be much more robust and the problem thereby diminished.

If the cause of the knock lays in uneven mixing and incomplete evaporation of inducted or injected fuel then the more cylindrical shape and smaller surface area of the main combustion chamber should ameliorate these problems, especially if the surfaces can be maintained at slightly higher temperatures. Baffling in the main combustion chamber or swirl generation may be employed if necessary.

I claim:

1. An auto-ignition internal combustion engine having a fuel/air mix and a compression ratio for auto-igniting the fuel/air mix, comprising:
   least one variable combustion volume having a first chamber with a power-transmitting member therein, and a second chamber into which the fuel/air mix is introduced, each said variable combustion volume further including means for controlling movement of gas, upon ignition, between said first chamber and said second chamber for controlling a rate of increase of gas pressure in said first chamber housing said power-transmitting member;
   means for varying an ignition point of a fuel/air mix by dynamically modifying a compression ratio for each combustion volume of said auto-ignition internal combustion engine, so that auto-ignition commences at a pre-determined point during an engine cycle depending upon said variable volume of said chamber such that auto-ignition occurs when the variable volume of one of said first and second chamber reaches a predetermined volume; and,
   means for controlling rate of increase of gas pressure for regulating force due to combustion thereby applied to said power-transmitting member associated with each said combustion volume.

2. The auto-ignition internal combustion engine having a fuel/air mix and a compression ratio for auto-igniting the fuel/air mix according to claim 1, wherein the fuel/air mix is introduced, and combustion takes place, in said second chamber.

3. The auto-ignition internal combustion engine having a fuel/air mix and a compression for auto-igniting the fuel/air mix according to claim 1, further comprising a valve located between said first chamber and said second chamber.

4. The auto-ignition internal combustion engine having a fuel/air mix and a compression ratio for auto-igniting the fuel/air mix according to claim 3, wherein said valve is a one-way valve.

5. The auto-ignition internal combustion engine having a fuel/air mix and a compression ratio for auto-igniting the fuel/air mix according to claim 1, further comprising a passage between said first chamber and said second chamber, and including means for selectively occluding said passage, so that when combustion occurs and increasing pressure is realized in said second chamber, the increasing pressure being substantially isolated from said first chamber having said power-transmitting member.

6. The auto-ignition internal combustion engine having a fuel/air mix and a compression ratio for auto-igniting the fuel/air mix according to claim 5, wherein said means for selectively occluding said passage is a blade movable between a first position wherein said blade substantially occludes the passage and a second position wherein said blade allows for said passage to be open, further including means for controlling movement and positioning of said blade for controlling delivery of pressure derived from combustion of the fuel/air mix to a piston for transmitting power.

7. The auto-ignition internal combustion engine having a fuel/air mix and a compression ratio for auto-igniting the fuel/air mix according to claim 6, wherein said blade is in said second posit ion during exhaust and induction strokes and, during a substantial portion of a compression stroke, said means for controlling movement and positioning of said blade moves said blade toward said first position for occluding said passage as the compression stroke moves close to that for auto-ignition.

8. The auto-ignition internal combustion engine having a fuel/air mix and a compression ratio for auto-igniting the fuel/air mix according to claim 6, further comprising a bypass passage in said passage around said blade, said bypass passage including a one-way valve for permitting gas movement from a clearance volume to said second chamber.

9. An auto-ignition internal combustion engine having a fuel/air mix and a compression ratio for auto-igniting the fuel/air mix, comprising:

a combustion volume having two chambers with one chamber of said two chambers being a combustion chamber with a variable volume and including means for adding a fuel/air mix to said combustion chamber with a compression ratio so that the fuel/air mix auto-ignites;

means for varying an ignition point of the fuel/air mix by dynamically modifying the compression ratio of said combustion volume, so that auto-ignition commences at a predetermined point during an engine cycle, depending upon said variable volume of said combustion chamber such that auto ignition occurs when the variable volume of the chamber reaches a predetermined volume, to account for a charge ignition delay time; and, means for controlling a rate of increase of gas pressure and for regulating movement of gas between the two chambers upon ignition.

10. The auto-ignition internal combustion engine having a fuel/air mix and a compression ratio for auto-igniting the fuel/air mix according to claim 9, wherein said two chambers are a first chamber and a second chamber, said first chamber being said combustion chamber and having a piston for dynamically modifying the compression ratio of said combustion volume, and said second chamber having a piston for compressing the fuel/air mix and transmitting power to a crank-shaft after ignition.

11. The auto-ignition internal combustion engine having a fuel/air mix and a compression ratio for auto-igniting the fuel/air mix according to claim 10, wherein said first chamber and said second chamber are each cylinders.

12. The auto-ignition internal combustion engine having a fuel/air mix and a compression ratio for auto-igniting the fuel/air mix according to claim 10, wherein said means for controlling rate of increase of gas pressure ratio includes a valve located between said first chamber, being said combustion chamber, and said second chamber, said valve being openable via pressure generated in said combustion chamber for controlling delivery of pressure to a power-transmitting member.

13. The auto-ignition internal combustion engine having a fuel/air mix and a compression ratio for auto-igniting the fuel/air mix according to claim 9, further comprising a power-transmitting piston wherein said two chambers are a first chamber being said combustion chamber and a second chamber having said power-transmitting piston therein, there being a passage between said first chamber and said second chamber means for selectively occluding said passage, so that when combustion occurs and increasing pressure is realized in said first chamber, the increasing pressure is substantially isolated from said second chamber having said power-transmitting piston.

14. The auto-ignition internal combustion engine having a fuel/air mix and a compression ratio for auto-igniting the fuel/air mix according to claim 13, wherein said means for selectively occluding said passage is a blade movable between a first position wherein said blade substantially occludes the passage and a second position wherein said blade allows for said passage to be open, further including means for controlling movement and positioning of said blade for controlling delivery of pressure derived from combustion of the fuel/air mix to said power-transmitting piston.

15. The auto-ignition internal combustion engine having a fuel/air mix and a compression ratio for auto-igniting the fuel/air mix according to claim 14, wherein said blade is in said second position during exhaust and induction strokes and, during a substantial portion of a compression stroke, said means for controlling movement and positioning of said blade moves said blade toward said first position for occluding said passage as the compression stroke moves close to auto-ignition.

16. The auto-ignition internal combustion engine having a fuel/air mix and a compression ratio for auto-igniting the fuel/air mix according to claim 14, further comprising a bypass passage in said passage around said blade, said bypass passage including a one-way valve for permitting gas movement from a clearance volume in the second chamber to said first chamber.

17. The auto-ignition internal combustion engine having a fuel/air mix and a compression ratio for auto-igniting the fuel/air mix according to claim 16, further comprising an inlet valve and an exhaust valve in said clearance volume in the second chamber.

18. The auto-ignition internal combustion engine having a fuel/air mix and a compression ratio for auto-igniting the fuel/air mix according to claim 17, further comprising means for directly injecting fuel into said combustion chamber.

19. The auto-ignition internal combustion engine having a fuel/air mix and a compression ratio for auto-igniting the fuel/air mix according to claim 17, further comprising means for injecting fuel into inducted air and drawing the inducted air into said clearance volume.

* * * * *